Nov. 26, 1946.  H. J. LUEHRS  2,411,739
CLUTCH
Filed March 17, 1943    2 Sheets-Sheet 2
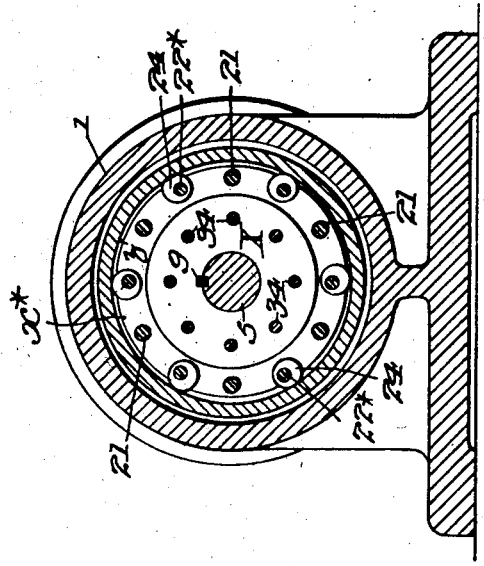
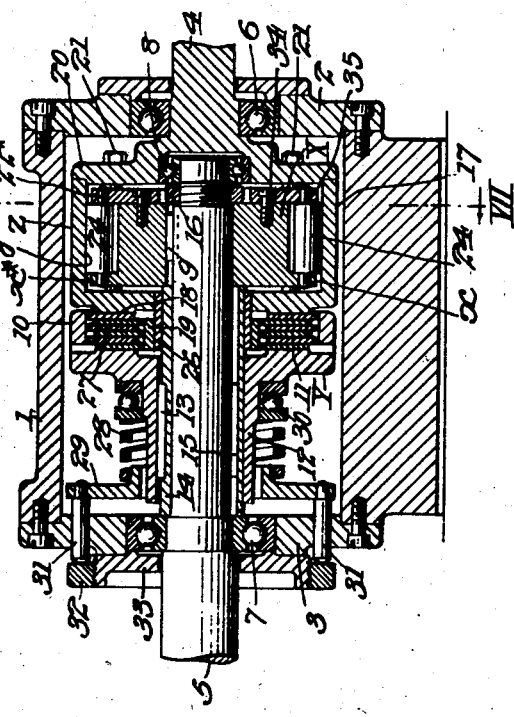
INVENTOR.

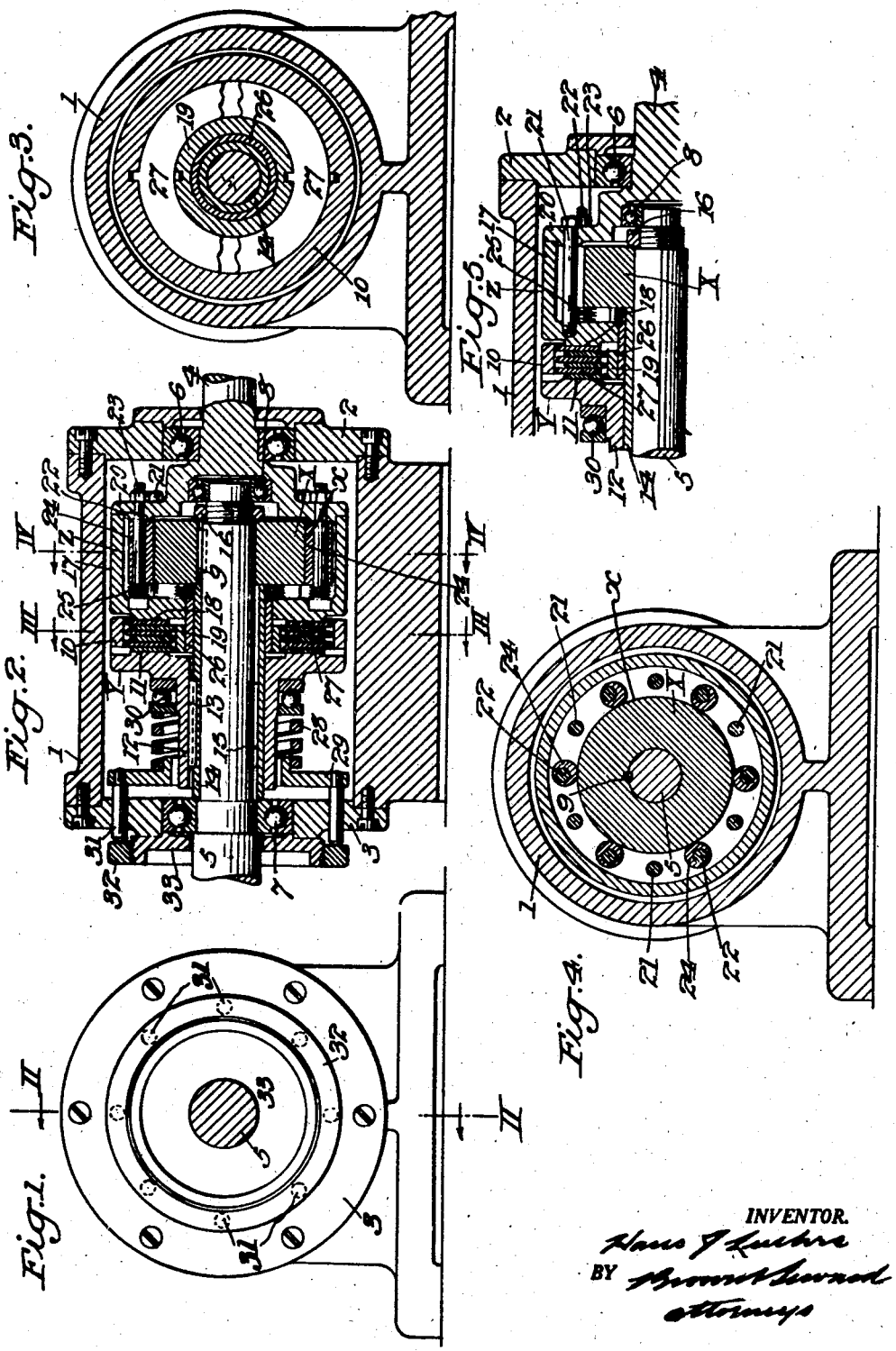

Patented Nov. 26, 1946

2,411,739

UNITED STATES PATENT OFFICE 2,411,739

CLUTCH

Hans J. Luehrs, Westerly, R. I., assignor to C. B. Cottrell & Sons Company, Westerly, R. I., a corporation of Delaware Application March 17, 1943, Serial No. 479,444

3 Claims. (Cl. 64—30)

The object of my invention is to provide a clutch with means for automatically locking the rotary driving and driven elements of the clutch together when the driven element starts, under its inertia forces, to overrun the driving element when the driving element is suddenly decelerated, thereby causing the positive deceleration of the driven element with the driving element.

My invention comprises a clutch having coacting friction clutch members operably connecting the driving and driven elements of the clutch, and coacting free wheeling or one-way clutch members, automatically operable to lock the driven element thereto when the driven element starts to overrun the driving element, as, for instance, when the driving element is suddenly decelerated.

My invention more particularly comprises a combined friction and free wheeling or one-way clutch having alined drive and driven shafts and in which the friction clutch member and the free wheeling clutch member which are carried by the drive shaft are made integral to form a combined friction and free wheeling clutch member.

Practical embodiments of my invention are represented in the accompanying drawings, in which Fig. 1 represents an end view of one embodiment of the combined friction and free wheeling clutch, the driven shaft of the clutch being shown in section;

Fig. 2 represents a longitudinal section, taken in the plane of the line II—II of Fig. 1;

Fig. 3 represents a transverse section, taken in the plane of the line III—III of Fig. 2;

Fig. 4 represents a transverse section, taken in the plane of the line IV—IV of Fig. 2;

Fig. 5 represents a detail transverse section showing one of the bolts for securing the combined friction and free wheeling clutch member to the drive shaft of the clutch;

Fig. 6 represents a longitudinal section of another embodiment of my invention; and Fig. 7 represents a transverse section taken in the plane of the line VII—VII of Fig. 6.

In both of the embodiments the housing 1 for the clutch is shown as provided with removable heads 2 and 3. The clutch drive shaft 4 extends through the head 2 to the interior of the housing 1 and the alined clutch driven shaft 5 extends through the head 3 to the interior of the said housing. An anti-friction bearing 6 for the drive shaft 4 is provided in the housing head 2 and an anti-friction bearing 7 is provided for the driven shaft 5 in the housing head 3.

A third anti-friction bearing 8 may be provided between the overlapping inner ends of the drive and driven shafts 4 and 5.

The clutch is shown as including an inner free wheeling clutch member X, a spring pressed friction clutch member Y and a combined friction and free wheeling clutch member Z.

The inner free wheeling clutch member X is shown as secured on the inner end of the driven shaft 5 as by a key 9, which clutch member has a cylindrical peripheral surface $x$ concentric to the axis of the said driven shaft.

The spring pressed friction clutch member Y comprises a cup-shaped element composed of a cylindrical portion 10, a side wall 11 and a hub 12, which hub is slidably interlocked, as by a key 13 on a sleeve 14 which in turn is locked, as by a key 15 on the driven shaft 5. This sleeve 14 extends from the anti-friction bearing 7 at the head 3 into contact with one side of the inner free wheeling clutch member X. A nut 16 which is threaded on the driven shaft 5 contacts the opposite side of the inner free wheeling clutch member X for holding the sleeve and clutch member against displacement along the driven shaft 5.

The combined friction and free wheeling clutch member Z comprises a cup-shaped element composed of a cylindrical portion 17, a side wall 18 and a hub 19. This cup-shaped element of the clutch member Z is shown as secured to the flange 20 on the inner end of the drive shaft 4 as by bolts 21.

In the embodiment shown in Figs. 1 to 5 inclusive, spindles 22 project from the side wall 18 of the cup-shaped element through the flange 20 where they are threaded to receive nuts 23.

These spindles 22 form axles on which sleeves 24 having eccentric cylindrical peripheral surfaces, are rotatably mounted. Coil springs 25 surround the spindles 22 and act to yieldingly hold the eccentric outer surfaces of these sleeves 24 in light contact with the cylindrical peripheral surface of the inner free wheeling clutch member X when the driven shaft 5 is driven by the drive shaft 4 through the clutch members Y and Z. These springs 25 will assist in causing the eccentrics 24 to lock the driven shaft 5 positively to the drive shaft 4 through the clutch member Z when the driven shaft 5 starts to overrun the drive shaft 4 by the deceleration and stoppage of the said drive shaft.

A bearing ring 26 may be inserted between the sleeve 14 on the driven shaft 5 and the hub 19 of the combined friction and free wheeling clutch member Z.

A plurality of friction rings or discs 27 are shown as located edgewise between the hub 19 of the clutch member Z and the cylindrical portion 10 of the clutch member Y and also flatwise between the side wall 11 of the clutch member Y and the side wall 18 of the clutch member Z.

Very accurately adjusted pressure may be applied to the friction clutch member Y as follows: a coil spring 28 surrounds the hub 12 of the friction clutch member Y between a follower 29 and an anti-friction thrust bearing 30, the lateral flange of the follower being provided with longitudinally disposed pins 31 which project through the head 3 of the clutch housing 1 into contact with a spring pressure adjusting nut 32 threaded onto a ring plate 33 secured to the said head 3.

In the operation: the frictional pressure between the friction clutch member Y and the combined friction and free wheeling clutch member Z is accurately adjusted to points where the starting and acceleration up to the normal speed of the drive shaft 4 will cause it to correspondingly start and accelerate the driven shaft 5.

When the drive shaft 4 is suddenly decelerated, the inertia force of the driven shaft is far greater than the frictional resistance between the friction clutch members Y and Z, thereby tending to cause the overrunning of the driven shaft 5. However, as the driven shaft 5 starts to overrun the decelerating drive shaft 4, the driven shaft 5 is automatically locked to the drive shaft 4 through the coaction of the free wheeling clutch member X and the free wheeling part of the combined friction and free wheeling clutch member Z, thereby causing the driven shaft to be positively decelerated and stopped by the drive shaft.

In the embodiment shown in Figs. 6 and 7, the inner free wheeling clutch member instead of the combined friction and free wheeling clutch member carries the eccentrics which lock the two members together when the driven shaft starts to overrun the drive shaft as by the sudden deceleration of the drive shaft.

In this second embodiment the sleeve eccentrics 24 are rotatably mounted on spindles 22* which project from a circumferential flange x* at one side of the inner free wheeling clutch member X through a ring 35 secured by bolts 34 to the other side of the said inner free wheeling clutch member. These eccentrics 24 are held lightly against the concentric inner wall z of the cylindrical portion 17 of the combined friction and free wheeling clutch member Z by centrifugal action.

It will thus be seen that in this second embodiment the eccentrics 24 will act to automatically and instantly lock the inner and outer free wheeling clutch members together when the inner clutch member starts to overrun the outer clutch member.

The embodiments of the combined friction and free wheeling clutch shown, described and claimed herein, are shown and described but not specifically claimed in my copending application filed of even date herewith, its Serial No. being 479,443.

The one-way clutch portion of the combined friction and one-way clutch shown and described herein forms the subject matter of my divisional application filed May 18, 1945, Serial No. 594,505.

It is evident that various changes may be resorted to in the construction, form an arrangement of the several parts without departing from the spirit and scope of my invention, and hence I do not intend to be limited to the particular embodiments herein shown and described, but what I claim is:

1. In a combined friction and one-way clutch, a fixed housing having two heads, alined drive and driven shafts rotatably mounted in their respective heads and having overlapping inner ends rotatably mounted the one on the other, a combined friction and one-way clutch member fixed to the inner end of the drive shaft, a one-way clutch member fixed to the inner end of the driven shaft, a spring pressed friction clutch member slidably locked to the driven shaft, friction discs for operatively connecting the clutch member with the combined friction and one-way clutch member, rotative eccentrics for automatically locking the combined friction and one-way clutch member with the one-way clutch member when the driven shaft tends to overrun the drive shaft, and means for adjusting the pressure of the spring of the spring pressed friction clutch member on the combined friction and one-way clutch member to a point where the starting and acceleration of the drive shaft up to its normal speed will cause a corresponding starting and acceleration of the driven shaft.

2. In a combined friction and one-way clutch, a fixed housing having two heads, alined drive and driven shafts rotatably mounted in their respective heads and having overlapping inner ends rotatably mounted the one on the other, a combined friction and one-way clutch member fixed to the inner end of the drive shaft, a one-way clutch member fixed to the inner end of the driven shaft, a spring pressed friction clutch member slidably locked to the driven shaft, friction discs for operatively connecting the clutch member with the combined friction and one-way clutch member, rotative eccentrics for automatically locking the combined friction and one-way clutch member with the one-way clutch member when the driven shaft tends to overrun the drive shaft, and means for adjusting the pressure of the spring of the spring pressed friction clutch member on the combined friction and one-way clutch member to a point where the starting and acceleration of the drive shaft up to its normal speed will cause a corresponding starting and acceleration of the driven shaft, said means comprising an annular threaded member secured to one of the housing heads, a nut threaded on said member, a spring follower and pins projecting axially from said follower through the said last named head into contact with the inner face of the said nut.

3. In a combined friction and one-way clutch, a fixed housing, alined drive and driven shafts rotatably mounted therein and having overlapping inner ends rotatably mounted the one on the other, a combined friction and one-way clutch member fixed to the inner end of the drive shaft and including a cup-shaped element having a cylindrical portion and a side wall, a one-way clutch member fixed to the inner end of the driven shaft within the said cup-shaped element and having a cylindrical portion, a spring pressed friction clutch member slidably locked to the driven shaft and including a cup-shaped element having a side wall, friction discs located within said last named cup-shaped element for operatively connecting the side walls of the friction clutch member and the combined friction and one-way clutch member, and rotative eccentrics located between the cylindrical portions of the combined friction and one-way clutch member and the one-way clutch member for automatically locking the combined friction and one-way clutch member to the one-way clutch member when the driven shaft tends to overrun the drive shaft.

HANS J. LUEHRS.